(12) United States Patent
Rothman et al.

(10) Patent No.: US 7,917,689 B2
(45) Date of Patent: Mar. 29, 2011

(54) METHODS AND APPARATUSES FOR NONVOLATILE MEMORY WEAR LEVELING

(75) Inventors: Michael A. Rothman, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 499 days.

(21) Appl. No.: 12/006,013

(22) Filed: Dec. 28, 2007

(65) Prior Publication Data

US 2009/0172253 A1    Jul. 2, 2009

(51) Int. Cl.
*G06F 12/02* (2006.01)

(52) U.S. Cl. ........ 711/103; 711/202; 711/203; 711/165; 711/E12.008

(58) Field of Classification Search ........... 711/103, 711/165, 202–203, E12.001, E12.008
See application file for complete search history.

(56) References Cited

U.S. PATENT DOCUMENTS

| 2008/0140918 | A1* | 6/2008 | Sutardja | ........................ | 711/103 |
| 2008/0189485 | A1* | 8/2008 | Jung et al. | ..................... | 711/115 |

OTHER PUBLICATIONS

Hyde; Randall. "I/O Mechanisms." Write Great Code: Understanding the Machine. 2004. p. 334.
Godse, A. P.; and Godse, D. A. "I/O Interfacing Techniques in 8086." Microprocessors and Microcontrollers. Technical Publications Pune. 2009. Three pages.

* cited by examiner

*Primary Examiner* — Jasmine Song
(74) *Attorney, Agent, or Firm* — Schubert Law Group PLLC; Garland D. Charpiot

(57) ABSTRACT

Apparatuses, systems, and computer program products that enable wear leveling of nonvolatile memory devices, such as flash memory devices, are disclosed. One or more embodiments an apparatus that has a receiver and a wear leveling module. The receiver may receive low-level write requests to update direct-mapped values of nonvolatile memory. The wear leveling module may determine physical locations of the nonvolatile memory that correspond to logical locations of the write requests. Alternative embodiments may comprise systems or apparatuses that include one or more various types of additional modules, such as low-level driver modules, error correction code modules, queue modules, bad block management modules, and flash translation layer modules. Other embodiments comprise computer program products that receive a direct-mapped low-level write request, determine a physical write location of nonvolatile memory that corresponds to a logical write location of the low-level write request.

19 Claims, 5 Drawing Sheets

METHODS AND APPARATUSES FOR NONVOLATILE MEMORY WEAR LEVELING

FIELD

The embodiments herein generally relate to the field of nonvolatile memory. More particularly, the embodiments relate to methods and apparatuses for supporting wear leveling of nonvolatile memory, such as wear leveling support of flash memory.

BACKGROUND

Many different types and styles of semiconductor memory devices exist to store data for electronic devices such as computers, portable media players, and digital cameras. For example, dynamic random access memory and static random access memory are two types of volatile memory. Programmable read only memory, electrically erasable programmable read only memory (EEPROM), and flash memory are three common types of nonvolatile memory. Unlike many types of other electronic devices, such as capacitors, resistors, and many field-effect transistors, memory cells of flash and EEPROM nonvolatile memory have a relatively short life span. In other words, the memory cells can only be erased and have values stored in them a finite number of times, or cycles, before becoming unreliable. Although the expected life spans vary according to memory types, physical constructions, methods of writing and erasing, the life span of many nonvolatile memory varies between ten thousand and one hundred thousand erase/write cycles.

Some devices employ a technique called wear leveling. Wear leveling helps extend the life span of a nonvolatile memory devices by manipulating data in such a manner that erases and re-writes of the data are distributed or shared over the entire memory device. By moving data saves around the device, no single cell or particular group of cells fail prematurely due to repetitive erasures and re-writes of data. Consequently, the overall life span of the memory device may be considerably increased.

Unfortunately, current wear leveling techniques have several deficiencies. First, the wear leveling mechanisms for memory devices are inapplicable to devices that employ direct memory access. For example, the wear leveling mechanisms for flash memory are not applicable to memory-mapped devices. Several issues arise due to the fact that wear leveling techniques are applied at the flash translation layer (FTL). Unfortunately, when a platform boots it accesses the flash memory through direct-mapped low-level driver accesses which do not employ wear leveling mechanisms. Second, many wear leveling mechanisms today employ complex algorithms that significantly impact performance of the devices accessing the memory. These inherent delays tend to become more pronounced and noticeable as the flash memories increase in size.

BRIEF DESCRIPTION OF THE DRAWINGS

Aspects of the embodiments will become apparent upon reading the following detailed description and upon reference to the accompanying drawings in which like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Apparatuses, systems, and computer program products that enable wear leveling of nonvolatile memory devices, such as flash memory devices, are contemplated. Some embodiments comprise an apparatus that has a receiver and a wear leveling module. The receiver may receive low-level write requests to update direct-mapped values of nonvolatile memory. The wear leveling module may determine physical locations of the nonvolatile memory that correspond to logical locations of the write requests. Alternative embodiments may include one or more various types of additional modules, such as low-level driver modules, error correction code modules, queue modules, bad block management modules, and flash translation layer modules.

Some embodiments comprise systems having nonvolatile memory and an interface apparatus for the nonvolatile memory, wherein the interface apparatus may receive write requests and determine physical addresses of the nonvolatile memory via a wear leveling module. Alternative embodiments may include such components as a queue module, a processor, dynamic random access memory (DRAM). One or more embodiments may process low-level write requests for direct-mapped values of nonvolatile memory.

Some embodiments comprise computer program products that receive a direct-mapped low-level write request and determine a physical write location of nonvolatile memory that corresponds to a logical write location of the low-level write request, wherein the physical write location is determined using a wear leveling routine. Alternative embodiments may add the low-level write request to a queue, parse calculations of the wear leveling routine, determine if resources are available to process the parsed calculations, and/or receive low-level read requests.

Figure 1:
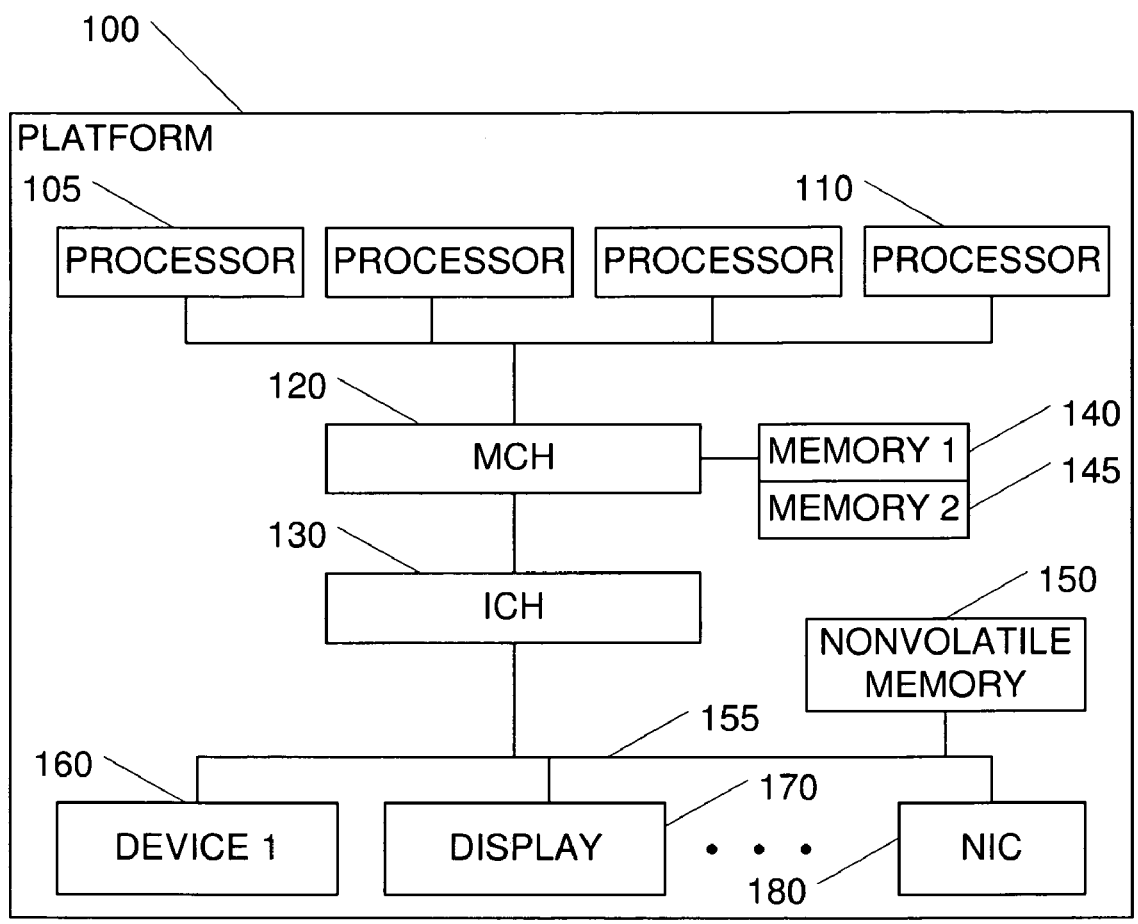
FIG. 1 depicts a system that may employ wear leveling routines for low-level memory accesses, such as direct memory accesses, comprising multiple processors, volatile and nonvolatile memory, and multiple devices.

Turning now to the drawings, FIG. 1 illustrates a system that may employ wear leveling routines for low-level memory accesses, such as direct memory accesses. As depicted in FIG. 1, a computing device or system, such as platform 100, may have one or more modules of nonvolatile memory like nonvolatile memory 150. A system like platform 100 may read information from and write information to nonvolatile memory while the system operates, which may include operation during a boot-up of the system. Nonvolatile memory 150 may comprise many different types of memory. For example, in one or more embodiments, nonvolatile memory 150 may comprise NOR-type flash memory. In one or more other embodiments, nonvolatile memory 150 may comprise NAND-type flash memory. In even further embodiments, nonvolatile memory 150 may comprise a combination of two or more types of nonvolatile memory, such as one NAND memory module and one NOR memory module.

Nonvolatile memory of a system may have a limited life span. For example, nonvolatile memory 150 may comprise NAND flash memory having a limited life of approximately 100,000 erase-write cycles. In other words, the nonvolatile memory 150 of a system may be susceptible to an error of saving and/or retrieving data after a series of more than 100,000 erase and write cycles.

To help extend the life of nonvolatile memory of a system, one or more embodiments may employ wear leveling algorithms that are platform-based. For example, platform 100 may employ one or more chipsets that perform wear leveling for saves of data to nonvolatile memory modules. Employing wear leveling routines at the platform level may enable a system to extend the life of nonvolatile memory of the system, even when the system may invoke low-level accesses of the nonvolatile memory that erase/write direct memory-mapped values.

Very low-level system wear leveling protection may be valuable for newer platforms. Without low-level wear leveling protection, newer platforms may wear holes into nonvolatile memory devices, such as flash memory devices, by increasingly storing data via direct-mapped components which are contained in fixed locations of the nonvolatile memory. For example, a system may perform write-accesses to nonvolatile memory ten or more times during a boot routine of the system. In a stress-test to simulate a real-world application, the system may reboot 10,000 times. Given that the system may perform 10 write-accesses to nonvolatile during the boot process, the reboot stress test will impart a 110,000 times write-access stress upon the system. Such stress may exceed the memory life specification of 100,000 erase/write cycles, unless platform-based wear leveling algorithms are employed. By moving the wear leveling algorithms lower in the utilization stack, such that the wear leveling mechanism is a feature of the platform, the platform may avoid issues that may otherwise be inherent to systems that use large and fast nonvolatile memory components.

Returning to FIG. 1, platform 100 has four processors, such as processor 105 and processor 110. In different embodiments platform 100 may be a part of a variety of different computing devices. For example, in one embodiment platform 100 may comprise a server computer. In other embodiments platform 100 may comprise a desktop, a notebook, a hand-held computer, or other type of computing device, such as a consumer electronics device. Various embodiments may employ varying numbers of processors. For example, alternative embodiments may have a single processor, dual processors, or have more processors, such as eight or more.

The processors of a system may be coupled to an interconnecting hub, such as memory controller hub (MCH) 120. One or more of the processors may execute operating instructions, such as instructions of user applications or an operating system (OS), in memory, such as memory modules 140 and 145, by interacting with MCH 120. For example, one or more of the processors may execute operating instructions for programs and applications run by users of platform 100, such as instructions of a web browser or a computer aided design (CAD) application executed via an OS.

The operating systems may comprise Linux®, Unix®, Macintosh® OS X, Windows® or some other operating system. Even further, some systems may operate multiple applications within multiple operating systems. For example, one system may execute virtualization software to isolate multiple operating systems and their applications from platform hardware resources and from each other. In other words, a system may execute several instances of an OS using virtual machine monitor (VMM) software, each instance of an OS being referred to as a virtual machine (VM) running in its own partition or section of memory. The VMM may manage the activities and requests of each OS, sharing control of actual system hardware as required. In the various embodiments one or more operating systems, which may run via VMM software, may utilize low-level write accesses of nonvolatile memory. Such systems may extend the life of nonvolatile memory by employing platform-based wear leveling routines.

MCH 120 may also couple the processors with an input-output (I/O) controller hub (ICH) 130. ICH 130 may allow the processors to interact with internal components and/or external components, such as device 160, display 170, network interface controller (NIC) 180, and nonvolatile memory 150. For example, nonvolatile memory 150 may store basic input-output system (BIOS) code, executed during a boot process. In one or more embodiments where nonvolatile memory 150 comprises BIOS code, during startup of the system the code may identify and allow the system to interact with component hardware, such as device 160, display 170, NIC 180, and other devices such as keyboards, mouse devices, universal serial bus (USB) flash memory devices, Serial ATA (SATA) devices, or Advanced Technology Attachment (ATA) devices, such as an ATA hard drive, a compact disc drive, or a digital versatile disc drive. The BIOS code of nonvolatile memory 150 may initialize memory modules 140 and 145, copy itself into a portion of one of the memory modules, transfer control to the instructions in memory modules 140 and 145, and start executing from the memory modules, load the boot loader for an operating system from a storage device, such as device 160, and transfer control to the loaded operating system. In one or more alternative embodiments, the BIOS code of nonvolatile memory 150 may perform similar steps for loading a single operating system, as just described, but load a VMM and multiple operating systems instead of loading a single operating system.

In the embodiments where nonvolatile memory 150 stores BIOS code, nonvolatile memory 150 may store configuration data or information for the system. For example, nonvolatile memory 150 may store one or more boot passwords, system date and time information, parameters related to different types of storage devices, the order or sequence in which the system should attempt to load an operating system, etc. As mentioned above, a system such as platform 100 may directly map a portion of nonvolatile memory 150 into a specific range of memory, such as a range of memory module 140 or memory module 145. In one or more embodiments, memory module 140 or 145 may comprise volatile memory, such as dynamic random access memory. During the boot process, as well as during normal operation, BIOS code or code of an operating system may repeatedly access values or variables stored in nonvolatile memory 150. For example, platform 100 may utilize the Windows® system information functions "GetFirmwareEnvironmentVariable" and "SetFirmwareEnvironmentVariable" to retrieve and store values for system variables stored in nonvolatile memory 150, which may be mirrored into memory module 140 and/or memory module 145.

Platform 100 may frequently update these firmware variables, or firmware values, using low-level accesses during the boot process, but avoid uneven wear and failures of nonvolatile memory 150 using wear leveling logic embedded in hardware logic of platform 100. In other words, one or more embodiments may enable wear leveling nonvolatile memory at the platform level. Wear leveling at the platform level may provide additional benefits since it may provide wear leveling regardless of the underlying access methodology, as well as provide a mechanism adjusting memory-mapped access. It should be noted that in various system embodiments the bootable BIOS firmware may reside in a fixed-location of a nonvolatile memory device, such as a flash memory device. Wear leveling at the platform level may have the additional benefit of changing the mapped locations in a manner that allows the reset vector to be mapped to variable locations of the nonvolatile memory, such as to variable locations of a flash memory image.

Platform 100 may be configured to present information to a user via display 170. For example, display 170 may comprise an Advanced Graphics Port (AGP) video card coupled to a computer monitor. In some embodiments, the type of display device may be a cathode ray tube (CRT) monitor, a liquid crystal display (LCD) screen, or a thin-film transistor flat panel monitor, as examples. Platform 100 may update firmware values associated with display 170, such as parameters for the type of video card or type of display device, using low-level accesses to nonvolatile memory 150. Such low-level accesses to nonvolatile memory 150 may nonetheless employ wear leveling logic embedded in hardware logic of platform 100 to help avoid failure of nonvolatile memory 150.

As shown in FIG. 1, platform 100 may employ numerous devices, such as device 160. Device 160 may comprise a keyboard, a mouse, a trackball, a touch-pad, an audio input device, a scanner, one or more computer speakers, or a touch-screen and stylus, as examples. Platform 100 may also have other types of devices, in addition to device 160, such as one or more storage devices. For example, platform 100 may have an ATA storage device, such as an ATA hard drive, a compact disc (CD) drive, or a digital versatile disc (DVD) drive. Alternatively, in one or more embodiments, platform 100 may also have one or more small computer systems interface (SCSI) devices, such as a SCSI hard drive or a Redundant Array of Inexpensive Disks (RAID). Platform 100 may update firmware values associated with various storage devices, such as parameters for communicating with the storage devices, using low-level accesses to direct-mapped values in nonvolatile memory 150. Such low-level accesses may occur during the boot process of platform 100 or after the boot process during routine operation. Platform 100 may employ wear leveling logic embedded in hardware logic, such as in a chipset of ICH 130, to help avoid failures of nonvolatile memory 150. For example, the wear leveling logic hardware may help prevent a "glass jaw" failure of nonvolatile memory 150 due to frequent writes of values to direct-mapped data of nonvolatile memory 150.

Platform 100 may communicate with numerous other computing devices coupled to platform 100 via NIC 180. For example, NIC 180 may couple platform 100 to numerous computers on a local area network (LAN) and/or a remote area network, which may include the Internet. Such computers may comprise notebook, desktop, or server computers, as examples, coupled to platform 100 via one or more networking devices, such as network routers, hubs, switches, and wireless networking devices. The computers coupled to platform 100 via NIC 180 may cause platform 100 to update values stored in nonvolatile memory 150. For example, platform 100 may employ remote management hardware and software that allow a person using a remote computer to retrieve and update values of data in nonvolatile memory 150. For such updates of values in nonvolatile memory 150, NIC 180 may invoke the use of wear leveling logic embedded in hardware of platform 100, to help avoid failures of nonvolatile memory 150.

Figure 2:
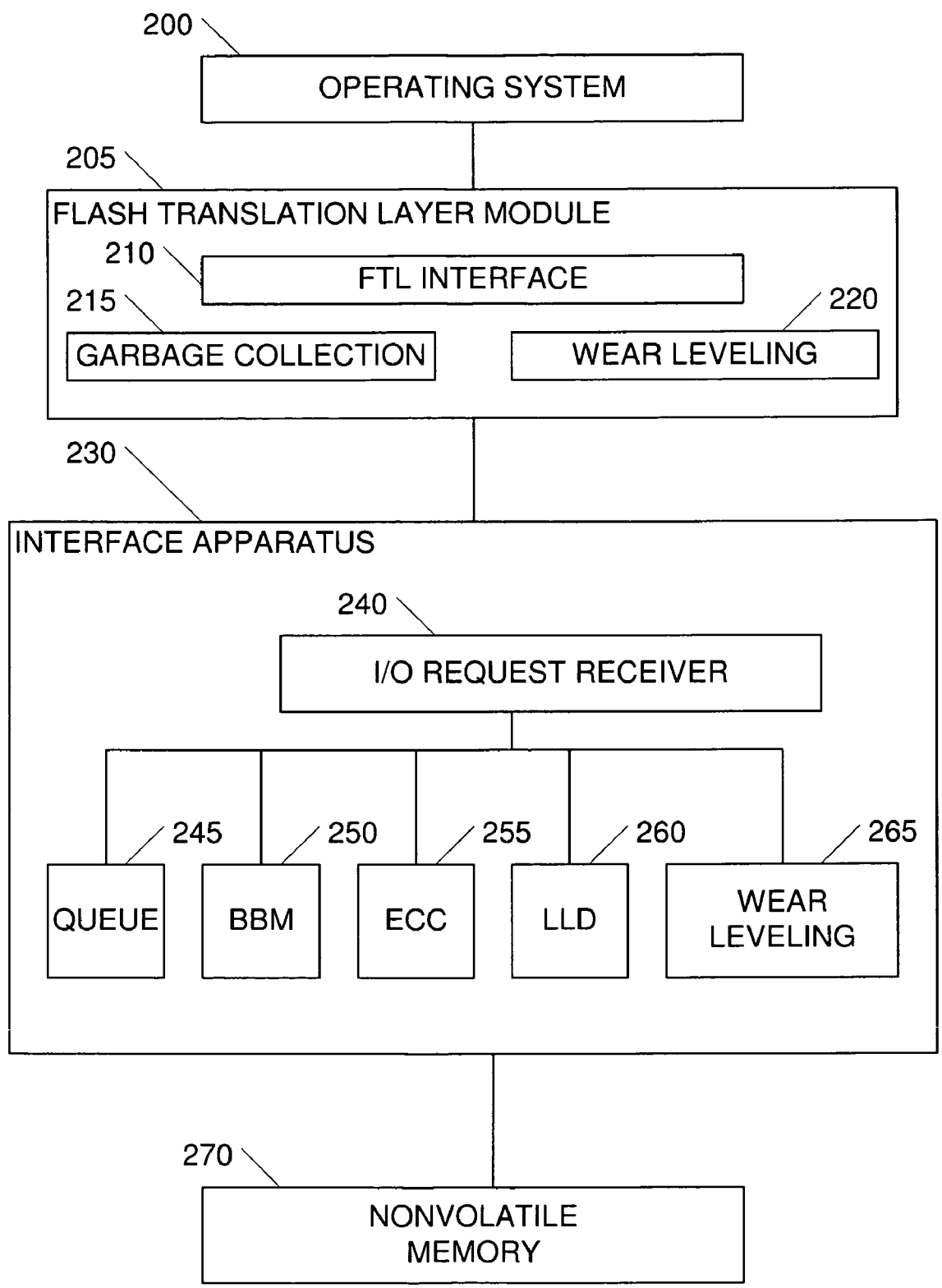
FIG. 2 shows an interface apparatus that may perform wear leveling for nonvolatile memory.

To illustrate how an interface apparatus for nonvolatile memory may enable a wear leveling, we turn to FIG. 2. FIG. 2 depicts an embodiment of interface apparatus 230. Interface apparatus 230 may comprise a hardware interface, such as that for a server or desktop computer, which may be implemented on a motherboard or peripheral card inserted into a motherboard or main board, or as a chip or set of integrated circuit chips of an apparatus for the platform. In one or more embodiments, interface apparatus 230 may comprise a chipset on a main board, coupling a processor to nonvolatile memory 270. For example, interface apparatus 230 may comprise a chipset coupling ICH 130 to nonvolatile memory 150 via a platform bus 155.

In one or more embodiments, interface apparatus 230 may allow both software-based and hardware-based wear leveling mechanisms to perform low-level accesses to nonvolatile memory 270. For example, one or more embodiments may employ a flash translation layer (FTL) module 205 that receives write requests from operating system 200 and processes those requests for nonvolatile memory 270. FTL module 205 may comprise a software driver that works in conjunction with one or more operating systems, such as operating system 200, to read and write data or information to nonvolatile memory 270 in a manner similar to a mass-storage block-based storage device, such as a hard disk drive.

To operating system 200, FTL module 205 may make nonvolatile memory 270 appear as a contiguous array of storage blocks. Flash transition module 205 may divide memory cells of nonvolatile memory 270 into numerous "virtual" small blocks of data, or sectors and manage the storage and retrieval of data in the nonvolatile memory 270 in such a manner which appears to emulate a block/sector storage device, even though the data is stored in different areas or regions of nonvolatile memory 270. That is to say, FTL module 205 may remap writing of the data to different physical locations for write accesses received from operating system 200. FTL module 205 may comprise software routines like flash translation layer interface 210 that work in conjunction with garbage collection module 215 and wear leveling module 220 to manage the storage of the data in the different physical locations nonvolatile memory 270. In other words, the routines of interface 210, garbage collection module 215, and wear leveling module 220 may track which portions of nonvolatile memory 270 contain data, which memory cells are unused, and which cells have been used but may be erased and reused.

To reduce the adverse effects of erase and write accesses to the memory cells of nonvolatile memory 270, operating system 200 may invoke the usage of algorithms of wear leveling module 220. Wear leveling module 220 algorithms may remap different physical locations for specific software-based memory address locations specified by write requests from operating system 200. What may not be intuitively obvious, however, is that the algorithms of wear leveling module 220 may not be applicable to the portions of nonvolatile memory 270 that are memory-mapped. For example, an apparatus or system may employ FTL module 205 and interface apparatus 230. When the apparatus or system boots, it may access nonvolatile memory 270 through direct-mapped low-level driver accesses which do not use wear leveling module 220. In other words, FTL module 205 may not invoke the algorithms of wear leveling module 220 for direct-mapped low-level driver erase-write accesses from operating system 200. Such direct-mapped low-level driver erase-write accesses may therefore avoid the protection afforded by wear leveling module 220.

To protect nonvolatile memory 270 for direct-mapped low-level driver erase-write accesses, interface apparatus 230 may receive the write requests via I/O request receiver 240 and determine that the write requests are low-level write requests via low-level driver module 260. Interface apparatus 230 may invoke wear leveling protection provided by wear leveling module 265 for the low-level write requests and complete the write requests to nonvolatile memory 270. Wear leveling module 265 may determine physical locations of nonvolatile memory 270 that correspond to logical locations of write requests received by receiver 240. In other words, interface apparatus 230 may provide wear leveling protection for nonvolatile memory 270 by way of wear leveling module 265 for write requests that do not benefit from wear leveling module 220 protection provided by FTL module 205, such as low-level driver erase-write accesses for direct-mapped data.

Interface apparatus 230 may comprise one or more other modules in addition to low-level driver module 260 and wear leveling module 265. Interface apparatus 230 may have an error correction code module 255 to calculate error correcting code for the values of the write requests. For example, interface apparatus 230 may employ uniform-sized data blocks. Each data block may be the same size as a virtual block used by operating system 200, such as 512 bytes. Error correction code module 255 may calculate forward error correction bits for each portion or string of data being saved to nonvolatile memory 270 and append the correction bits to the data as it is being written. In different embodiments, the error correction code may be calculated at different times. For example, in one embodiment the error correction code may be calculated before wear leveling protection is applied by wear leveling module 265. In another embodiment, the error correction code may be calculated after the wear leveling protection is applied by wear leveling module 265. Worth pointing out, the error correction provided by error correction code module 255 may apply to both low-level and high-level accesses for data of nonvolatile memory 270. In other words, interface apparatus 230 may provide error correction via error correction code module 255 for both high-level accesses processed by FTL module 205 and low-level accesses processed by low-level driver module 260.

Interface apparatus 230 may have a bad block management module 250 to detect problems of nonvolatile memory 270. For example, nonvolatile memory 270 may have blocks that contain one or more bits that are invalid or unreliable. Bad block management module 250 may create a table that lists all blocks that contain invalid or unreliable bits of nonvolatile memory 270. Bad block management module 250 may prevent interface apparatus 230, as well as FTL module 205, from addressing or otherwise writing data or information to blocks in the table of bad blocks.

Interface apparatus 230 may also have a queue module 245 to store requests received by receiver 240. For example, operating system 200 may dispatch a series of low-level accesses for data of nonvolatile memory 270. Since a processor executing the instructions of operating system 200 may operate relatively fast, as compared to relatively slow accesses for data of nonvolatile memory 270, interface apparatus 230 may allow the processor and operating system 200 to perform other tasks while interface apparatus 230 accesses data stored in nonvolatile memory 270. In different embodiments, queue module 245 may be configured to process, or queue, different types of access requests. For example, in some embodiments queue module 245 may be configured to only store low-level access requests. In other embodiments, queue module 245 may be configured to queue or store both low and high-level access requests. In even further embodiments, interface apparatus 230 may comprise two or more of queue module 245, one or more modules to store low-level access requests and one or more modules to store high-level access requests.

One should note that alternative embodiments may employ different arrangements of elements, which may differ from those depicted in FIG. 2. For example, some embodiments may not have wear leveling module 220 in FTL module 205. In such embodiments, wear leveling module 265 may perform wear leveling for both low-level and high-level write accesses of nonvolatile memory 270. In other embodiments, one or more functions performed by FTL module 205 may be performed by interface apparatus 230. For example, software-based functions performed by FTL interface 210 and garbage collection module 215 may be implemented via hardware logic, which may include firmware, in interface apparatus 230. In other words, some embodiments may not have an FTL module 205, where interface apparatus 230 performs one or more of the functions of FTL module 205. Additionally, interface apparatus 230 may vary in different embodiments. Some embodiments of interface apparatus 230 may have no queue module 245 or no bad block management module 250, as examples. Alternative embodiments of interface apparatus 230 may also include one or more other modules, in addition to the modules shown for interface apparatus 230 in FIG. 2.

Figure 3:
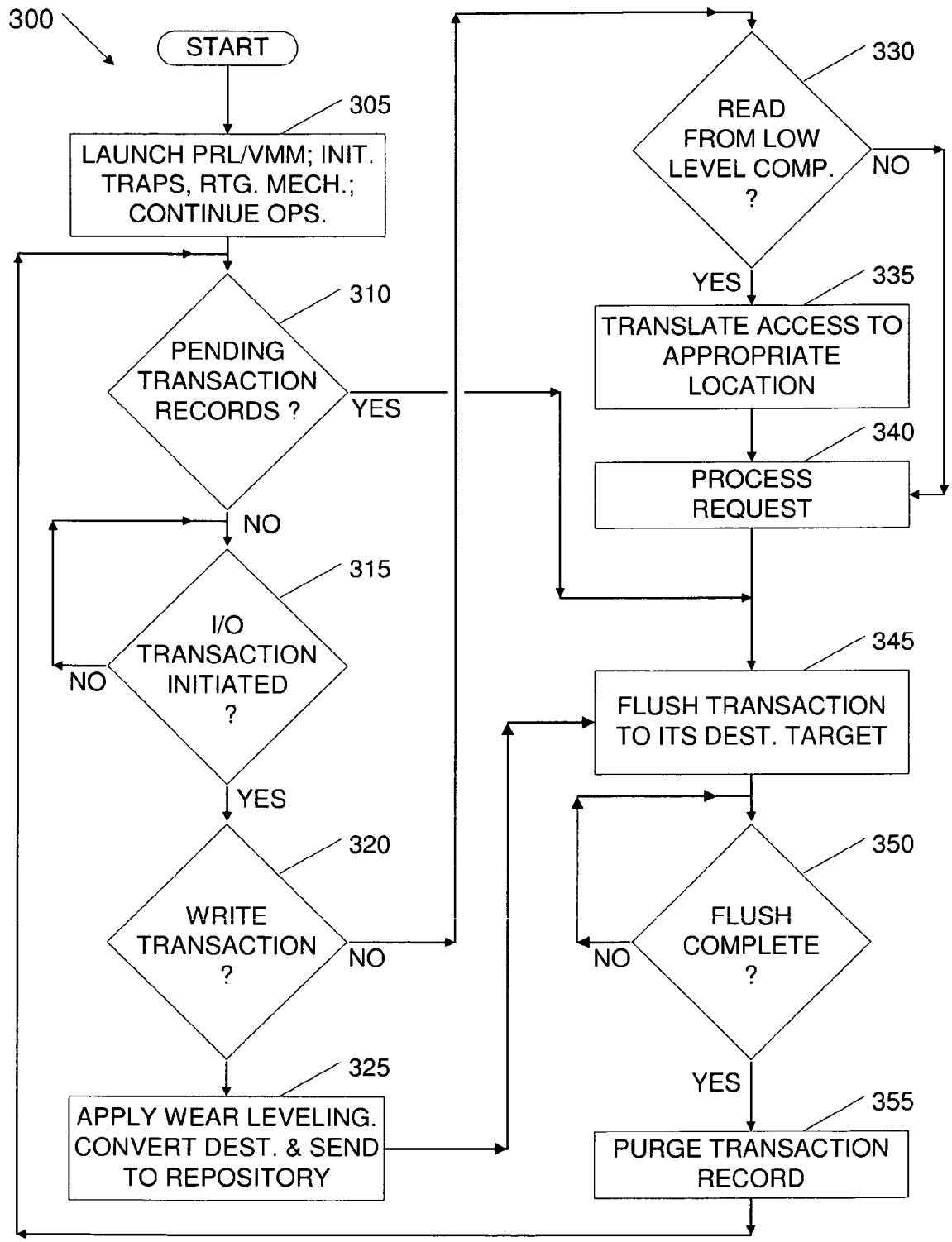
FIG. 3 illustrates an embodiment of an algorithm that may be implemented by a computing device for wear leveling of nonvolatile memory.

FIG. 3 shows a flowchart 300 for an algorithm that may be implemented by a computing device, such as platform 100 or interface apparatus 230, for wear leveling of nonvolatile memory. For example, one or more embodiments may implement the algorithm described by flowchart 300, or at least a portion of the algorithm, as firmware or hardware-encoded instructions in an interface for nonvolatile memory. Such instructions may be stored in one or more hardware integrated circuit packages, which may include memory components of a platform or computing device, such as interface apparatus 230 of FIG. 2.

Flowchart 300 begins with launching platform resource layer and virtual machine monitor software, initializing traps, and initializing system routing mechanisms, as well as initializing and continuing system operations (element 305). For example, a user of platform 100 may apply power to the platform and initiate a boot sequence. Platform 100 may identify peripheral devices attached to platform 100 in order to define low-level software routines that will allow platform 100 to interact with the peripheral devices, such as device 160, display 170, NIC 180, and other devices such as a keyboard, a mouse, and mass-storage devices. BIOS code of platform 100 may cause the platform to initialize memory modules 140 and 145, and force processor 105 to copy the BIOS code into a portion of one of the memory modules. Platform 100 may then execute the BIOS instructions copied to the memory modules and load VMM software, as well as code for several operating systems, from the mass-storage device into one or more of the memory modules and transfer processor control to the loaded VMM code. Platform 100 may also define one or more interrupt vectors, which contain the addresses of various service routines, in one or more of the memory modules. Platform 100 may then transfer control to the VMM software to allow platform 100 and its processors to monitor for hardware interrupts and software traps.

After booting the platform or computing device, an algorithm according to flowchart 300 may then start monitoring for any input or output transactions that may be pending for a nonvolatile memory device (element 310). For example, logic of interface apparatus 230 may determine whether there are low-level transaction requests or records pending in queue module 245. If the logic of interface apparatus 230 determines that there are no low-level transaction records pending in queue module 245 (element 310), an algorithm according to flowchart 300 may proceed by determining whether any input transaction records or any output transaction records have been initiated (element 315). For example, logic of interface apparatus 230 may determine whether there is a low-level transaction request available at I/O request receiver 240 or at low-level driver module 260.

If logic of interface apparatus 230 determines that there is a transaction request available at I/O request receiver 240 or low-level driver module 260 (element 315), an algorithm according to flowchart 300 may then determine whether the transaction is a read request or a write request (element 320). If logic of interface apparatus 230 determines that the transaction is a write request (element 320), the algorithm of FIG. 3 may have interface apparatus 230 apply a wear leveling heuristic to the incoming data stream, convert the logical destination of the data into an associated/calculated physical location for the write request, and send the associated request with the calculated physical location to queue module 245 (element 325). If conditions permit, such as nonvolatile memory 270 being ready to receive and write a portion of the data, the algorithm of FIG. 3 may then continue by having interface apparatus 230 flush the write request (element 345) to the destination target memory device, in this case nonvolatile memory 270.

If logic of interface apparatus 230 determines that the transaction is a read request (element 320), the algorithm of FIG. 3 may have interface apparatus 230 determine whether or not the read request is a low-level read request for data of nonvolatile memory 270 (element 330). If the read request is a low-level read request, the logic of interface apparatus 230 may translate access to the appropriate location (element 335) for mapping of the data so that the request may be processed (element 340). For example, logic interface apparatus 230 may receive the request at I/O request receiver 240, determine that the request is a low-level read request via logic that may include low-level driver module 260, and determine the physical read location for the data of the read from nonvolatile memory 270 using bad block management module 250, low-level driver module 260, and wear leveling module 265.

If logic of interface apparatus 230 determines that the read request is not a low-level read request for data of nonvolatile memory 270 (element 330), additional logic or processing hardware and/or firmware of interface apparatus 230 may skip translation for the appropriate location and proceed by processing the request (element 340). For example, logic interface apparatus 230 may receive the request at I/O request receiver 240, determine that the request is a high-level read request via logic of interface apparatus 230, and associate a physical read location in nonvolatile memory 270 for the data indicated by the logical address of the read request. Processing that may be associated with executing a read request (element 340) may include placing the read request in some type of buffering memory, such as memory of a queue for queue module 245, so that the read request becomes a pending read request, to be completed or carried out whenever interface apparatus 230 is able to access the contents of nonvolatile memory 270.

An algorithm according to flowchart 300 may continue by flushing the transaction to its destination target (element 345). In other words, interface apparatus 230 may perform or complete a read or write request, saving or retrieving the data or information to or from nonvolatile memory 270, and removing the pending request from the buffer or queue. Flushing the transaction (element 345) may occur after processing the request (element 340), after applying the wear leveling heuristic and sending the request to a queue (element 325), or after determining that a transaction may be pending (element 310). Upon determining that the flushing of the transaction is complete (element 350), an algorithm according to flowchart 300 may proceed by purging the transaction record from the buffer or queue (element 355) and continuing to monitor for any input or output transactions that may be pending for nonvolatile memory device (element 310).

Figure 4:
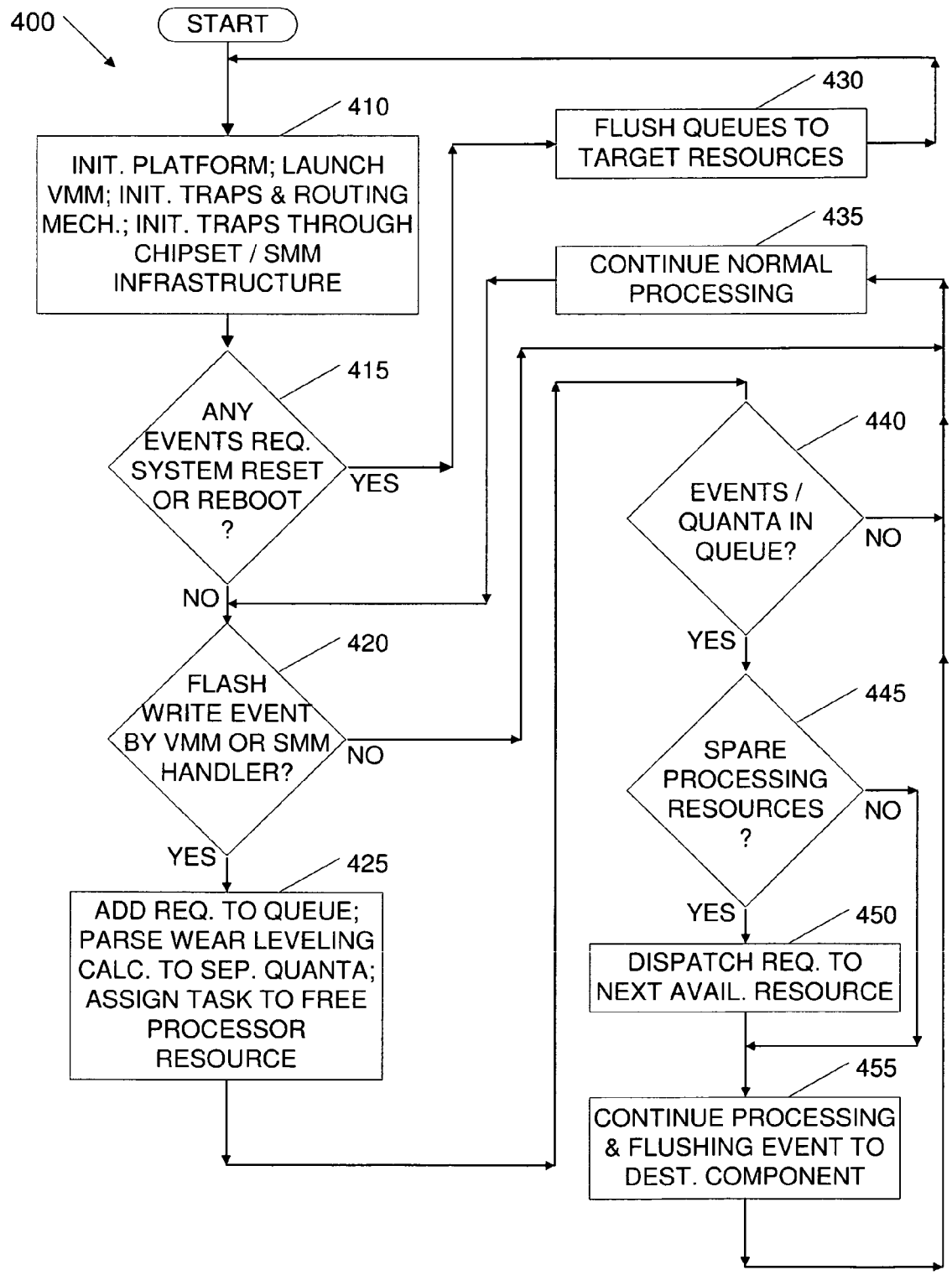
FIG. 4 illustrates an alternative embodiment of an algorithm that may be implemented for wear leveling, which may include queuing of write events for nonvolatile memory.

FIG. 4 depicts a flowchart 400 for an alternative embodiment of an algorithm that may enable wear leveling for nonvolatile storage at the platform level, yet potentially avoid performance issues due to software-based wear leveling algorithms. One or more embodiments may implement the algorithm, or at least part of the algorithm, described by flowchart 400 as firmware or hardware-encoded instructions in an interface for nonvolatile memory. Such instructions may be stored in one or more hardware integrated circuit packages, which may include memory components of a platform or computing device, such as interface apparatus 230 of FIG. 2. An algorithm like the one illustrated by flowchart 400 may increase the life of nonvolatile memories, such as flash memory devices, while also allowing for the transactions to be performed as non-blocking operations and enabling such non-blocking operations to queued. By allowing non-blocking operations instead of only blocking operations, the algorithm may speed up accesses to the nonvolatile memories and extend their life cycles. Additionally, the algorithm may provide platform-level wear leveling for nonvolatile memories regardless of the underlying access methodology, as well as provide a mechanism to have adjusted memory-mapped access. Consequently, instead of having firmware content, such as bootable BIOS firmware, remain in a fixed-location in nonvolatile or flash memory, the mapped location of the firmware content may be adjusted so that the reset vector can be mapped to variable locations of the nonvolatile/flash image.

Flowchart 400 begins with initializing a platform, launching VMM software, initializing system routing mechanisms, and initializing traps through chipset or system management mode (SMM) hardware (element 410) and then determining whether there are any critical events that require that the system reboot or otherwise reset (element 415). If there are any critical events, the algorithm may flush queues for nonvolatile memory, or otherwise commit any buffered or delayed changes to the nonvolatile memory resources or devices (element 430). For example, a system having interface apparatus 230 would flush and items in queue module 245 to nonvolatile memory 270. If there are no events requiring a system reset or reboot (element 415), the algorithm may proceed by determining if there is a write event trapped by VMM software or the SMM handler (element 420). If there is no write event trapped, the algorithm may proceed by continuing normal system processing (element 435), such as allowing one or more system processors to execute coded instructions of the VMM software, the OS, or applications, and periodically checking for flash write events that may have been trapped (element 420).

If there is a write event trapped (element 420), the algorithm may proceed by adding the request to an internal queue, such as a queue of queue module 245, parsing wear leveling calculations to separable quanta as applicable, and assigning one or more tasks to free processor resources, such as one or more core threads (element 425). If there are no events/quanta in the queue to process (element 440), the algorithm may continue system processing (element 435) and periodically check for flash write events that may become trapped (element 420). However, if there are events/quanta to process (element 440) the algorithm may then check to see if there are spare processing resources available to process the events/quanta (element 445). If there are no spare processing resources, the algorithm may delay dispatching the request and proceed by continuing to process and flush events to destination components/nonvolatile memory devices (element 455). If there are spare processing resources (element 445), the algorithm may dispatch the request to the next available resource, such as the next available free core thread (element 450), continue to process and flush events to destination nonvolatile memory devices (element 455), return to process system activities (element 435), and periodically checking for flash write events (element 420).

By employing the algorithm illustrated in FIG. 4, or a similar algorithm, a platform or system may allow for threaded SMM flows or parallel processing in a VMM for wear leveling mechanisms. In other words, the algorithm may leverage this parallelism for processor workloads, such as establishing a queue mechanism for accomplishing non-blocking and parallel wear leveling of nonvolatile memory devices, such as flash memory media. The algorithm illustrated in FIG. 4 may allow system management interrupt (SMI) handlers and boot-service firmware to be run with multiple processors, avoiding the issue of concurrence or mutual exclusion required by the single "disable interrupts" lock. By updating nonvolatile memories in a more intelligent fashion, the algorithm may augment how the updates occur so that they minimally affect the experience of the platform or system. Even further, the algorithm may avoid unnecessary erase operations and prolong the life of nonvolatile memories that the platform may depend upon for normal or routine operation.

Another embodiment of the invention may be implemented as a program product, such as firmware, for use with a computing device or platform to enable wear leveling. The program(s) of the program product may define functions of the embodiments (including the methods described herein) and can be contained on a variety of data and/or signal-bearing media. Illustrative data and/or signal-bearing media include, but are not limited to: (i) information permanently stored on non-writable storage media (e.g., read-only memory devices within a computer, such as on a platform motherboard); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such data and/or signal-bearing media, when carrying computer-readable instructions that direct the functions of the present invention, represent embodiments of the present invention.

The routines executed to implement the embodiments of the invention, may be part of a component, module, object, or sequence of instructions. The computer program of the present invention typically is comprised of a multitude of instructions that will be translated by a computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus an embodiment should not be limited to use solely in any specific application identified and/or implied by such nomenclature.

Figure 5:
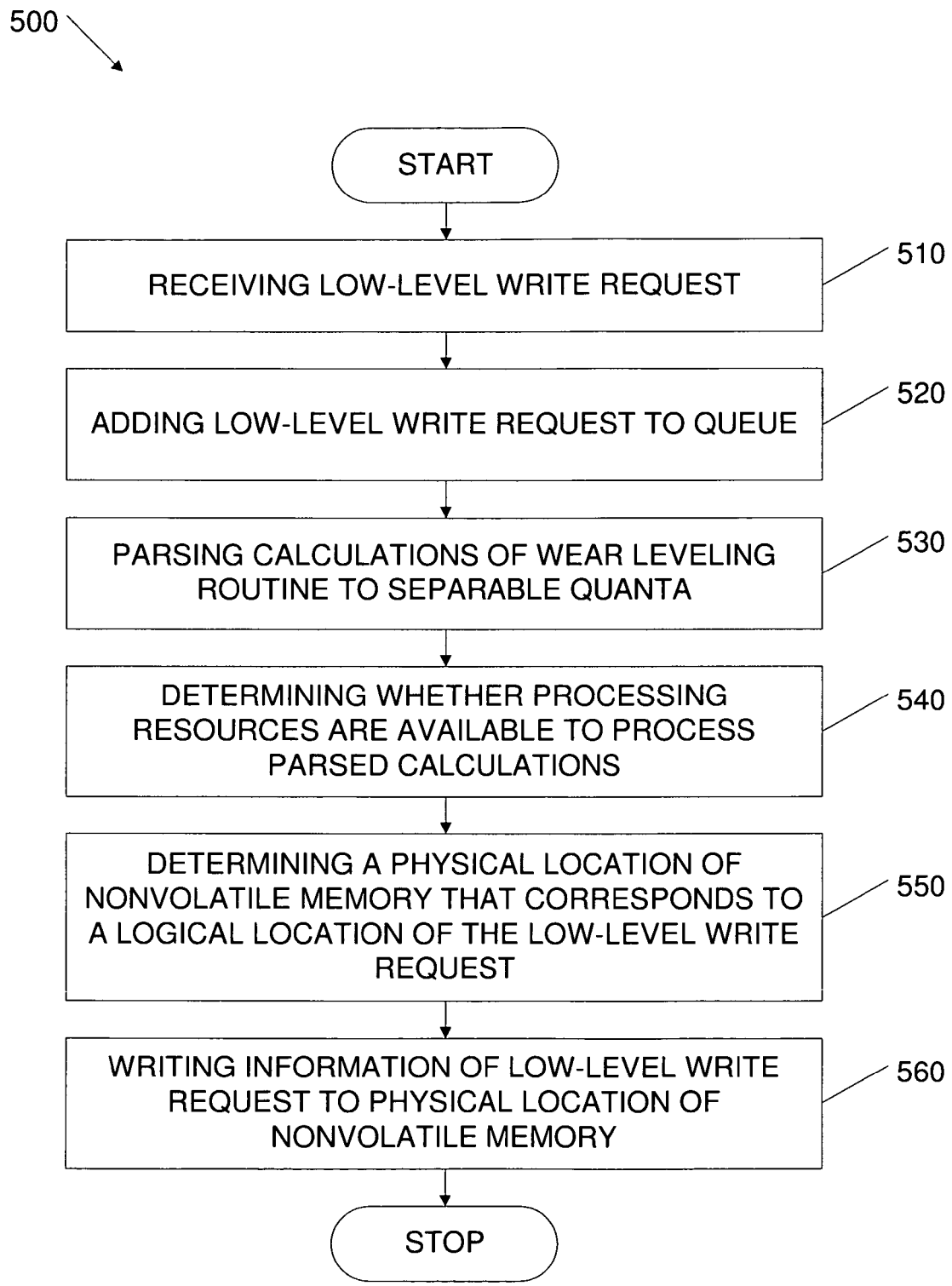
FIG. 5 illustrates a method of writing information to nonvolatile memory, which includes queuing, parsing calculations for wear leveling, and determining a physical location for a write request.

FIG. 5 depicts a flowchart 500 that illustrates a method, which may be implemented by way of a program product such as software or firmware, to enable wear leveling at a low level within a system. For example, the method may be executed by state-machine hardware or firmware in an application-specific integrated circuit chip of an embedded system that uses nonvolatile memory, such as one or more flash memory devices. Flowchart 500 begins with receiving a low-level write request (element 510) and adding the low-level write request to a queue (element 520). For example, I/O request receiver 240 may receive a low-level write request from operating system 200 and add the low level write request to a queue in queue module 245, wherein the request is to write data to a direct-mapped memory address of nonvolatile memory 270. In other words, flash translation layer 205 may simply pass the write request from OS 200 to interface apparatus 230 without utilizing wear leveling module 220.

A method according to flowchart 500 may continue by parsing calculations of a wear leveling routine to separable quanta (element 530) and determining whether processing resources are available to process parsed calculations (element 540). For example, interface apparatus 230 may be busy processing one or more previously issued read or write requests for nonvolatile memory 270. Since interface apparatus 230 cannot instantaneously read and write data from/to nonvolatile memory 270, or instantaneously calculate physical memory locations that correspond to logical memory locations using wear leveling module 265, interface apparatus may have logic which divides the pending read or write requests into a series of tasks that can be executed in steps, allowing interface apparatus 230 to send and receive data from both OS 200 and nonvolatile memory 270 in parts, or sections, so that a processor executing OS 200 will not have to wait on interface apparatus 230.

A method according to flowchart 500 may then determine a physical location of nonvolatile memory that corresponds to a logical location of the low-level write request (element 550) and write information of the low-level write request to a physical location of the nonvolatile memory (element 560). Continuing with our previous example, interface apparatus 230 may have processed all of the previously queued requests in queue module 245, except for the initial low-level write request (element 510). Using wear leveling module 265 interface apparatus 230 may determine a physical block address that corresponds to a logical block address associated with the low-level write request, wherein the physical block address may vary depending on wear leveling module 265.

It will be apparent to those skilled in the art having the benefit of this disclosure that the present invention contemplates apparatuses, systems, and computer program products that enable wear leveling for nonvolatile memory devices. It is understood that the form of the invention shown and described in the detailed description and the drawings are to be taken merely as examples. It is intended that the following claims be interpreted broadly to embrace all the variations of the embodiments disclosed.

Although the present invention and some of its aspects have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus of a platform of a computing device, the apparatus comprising:
   a receiver to receive a low-level write request for nonvolatile memory, wherein the nonvolatile memory comprises memory-mapped addresses for the platform, wherein further the low-level write request is to update a value of a direct-mapped address of the memory-mapped addresses, wherein further the direct-mapped address specifies a first physical location of the nonvolatile memory; and
   a wear leveling module coupled to the receiver, the wear leveling module to determine a second physical location of the nonvolatile memory for the low-level write request, wherein the receiver and the wear leveling module comprise elements of a chipset of the platform.

2. The apparatus of claim 1, further comprising a low-level driver module coupled with the receiver to process low-level requests of the receiver.

3. The apparatus of claim 1, further comprising an error correction code module coupled with the receiver, the error correction code module to calculate error-correcting code for the low-level write request.

4. The apparatus of claim 1, further comprising a bad block management module coupled to the nonvolatile memory, the bad block management to detect problems of the nonvolatile memory.

5. The apparatus of claim 1, further comprising a flash translation module coupled to the receiver, the flash translation module to process requests of an operating system for the nonvolatile memory.

6. The apparatus of claim 5, wherein the flash translation module comprises a second wear leveling module, the second wear leveling module comprising software to determine physical locations of the nonvolatile memory for the requests of the operating system.

7. The apparatus of claim 1, further comprising a queue module to store requests received by the receiver.

8. The apparatus of claim 1, wherein the nonvolatile memory comprises flash memory.

9. An apparatus of a platform of a computing device, the apparatus comprising:
   a receiver to receive a write request for a flash memory device, wherein the flash memory device comprises memory-mapped addresses, wherein further the write request is to update a value of a direct-mapped address of the memory-mapped addresses, wherein further the direct-mapped address comprises a first physical location of the flash memory device; and
   a wear leveling module coupled to the receiver, the wear leveling module to determine a second physical location of the flash memory device for the write request to enable the flash memory device to store the value in the address of the second physical location, wherein further the receiver and the wear leveling module comprise elements of a chipset of the platform.

10. The apparatus of claim 9, further comprising a queue module coupled with the receiver, the queue module to store a plurality of write requests for the flash memory device.

11. The apparatus of claim 10, wherein the receiver is configured to receive write requests from a flash translation layer (FTL) module of the platform, wherein further the receiver is configured to receive low-level write requests which bypass the FTL module, wherein further the wear leveling module is configured to determine the second physical location only when then write request comprises a low-level write request.

12. The apparatus of claim 11, wherein the receiver is configured to receive the low-level write request from an operating system of the platform.

13. The apparatus of claim 12, wherein the wear leveling module is configured to parse calculations of a wear-level routine to a plurality of quanta.

14. The apparatus of claim 13, wherein the receiver prevents the wear leveling module from determining alternative physical locations of write-requests remapped by the FTL module.

15. A system, comprising:
   nonvolatile memory; and
   an interface apparatus coupled to the nonvolatile memory, the interface apparatus configured to:
      receive a write request for the nonvolatile memory, wherein the nonvolatile memory comprises memory-mapped addresses, wherein further the write request is to update a value of a direct-mapped address of the memory-mapped addresses, wherein further the direct-mapped address comprises a first physical location of the nonvolatile memory; and
      determine a second physical location for the write request, wherein the second physical location is determined based upon a wear leveling module of the interface apparatus.

16. The system of claim 15, further comprising a queue module coupled with the interface apparatus, the queue module to store a plurality of access requests for the nonvolatile memory.

17. The system of claim 16, wherein the queue module is arrange to enable the interface apparatus to perform non-blocking wear leveling operations for the nonvolatile memory.

18. The system of claim 15, further comprising a processor and a dynamic random access memory module, the processor coupled with the nonvolatile memory.

19. The system of claim 15, wherein the write request comprises a low-level write request for the value of the direct-mapped address of the nonvolatile memory.

* * * * *